US006519594B1

United States Patent
Li

(10) Patent No.: US 6,519,594 B1
(45) Date of Patent: Feb. 11, 2003

(54) COMPUTER-IMPLEMENTED SHARING OF JAVA CLASSES FOR INCREASED MEMORY EFFICIENCY AND COMMUNICATION METHOD

(75) Inventor: Qiaoyun Li, Cupertino, CA (US)

(73) Assignees: Sony Electronics, Inc., Park Ridge, NJ (US); Sony Corporation, Tokyo (JP)

(*) Notice: Subject to any disclaimer, the term of this patent is extended or adjusted under 35 U.S.C. 154(b) by 0 days.

(21) Appl. No.: 09/260,259

(22) Filed: Mar. 1, 1999

Related U.S. Application Data
(60) Provisional application No. 60/108,468, filed on Nov. 14, 1998.

(51) Int. Cl.[7] .............................................. G06F 17/00
(52) U.S. Cl. ........................ 707/10; 709/312; 709/201
(58) Field of Search ............... 707/1–206; 709/100–332

(56) References Cited

U.S. PATENT DOCUMENTS
6,330,587 B1 * 12/2001 Tedone et al. .............. 709/201
6,349,295 B1 * 2/2002 Tedesco et al. .............. 707/3
6,370,539 B1 * 4/2002 Ashby et al. ............... 707/102

OTHER PUBLICATIONS
Surdeanu et al., "Design and performance analysis of a distributed Java Virtual Machine", Parallel and Distributed Systems, IEEE Transactions on, vol. 13, Issue 6, Jun. 2002, pp. 611–627.*

Tullman et al., "Janos: a Java–oriented OS for active network nodes", DARPA Active NEtworks Conference and Exposition, 2002, Proceedings, 2002, pp. 117–129.*

Ventura et al., "HIOOORS—a high integrity distributed deterministic Java environment", Object5 Oriented Real Time Dependable Systems, 2002 (WORDS 2002), Proceedings of the Seventh International Workshop on, 2002, pp. 113–118.*

* cited by examiner

*Primary Examiner*—David Jung
(74) *Attorney, Agent, or Firm*—Wagner, Murabito & Hao LLP

(57) ABSTRACT

A computer-implemented method and system for allowing Java classes to be shared among many Java virtual machines (JVMs) including a communication system allowing Java and native applications to readily interoperate. An implementation of the JVM on an operating system platform, e.g., the Aperios AV/OS, allows a variety of applications including desktop applications, applets and Internet based applications, home networking applications, MHEG-6 applets, gaming, gaming applications and next generation audio visual applications to operate with the operating system. The present invention provides a shared memory pool (SMP) into which a JVM and store and register a particular Java class. The stored and registered Java class is then accessible by other JVMs using the SMP and a Java layer class manager that is implemented in software. The Java layer class manager requires other JVMs to access a key for the stored class in order to synchronize access to the Java class among several installed and operating JVMs of the computer system. By sharing common Java classes in this fashion, the memory resource overhead required to operate multiple JVMs on a common computer system is drastically reduced thereby allowing a multiple JVM platform to be operable on an embedded computer system. A novel communication method is also disclosed for communicating information between a JVM application and a native application using the computer system's operating system. The novel communication method also allows multiple JVM applications to communicate using the shared memory pool. These functions are incorporated into a Java-Layer that supports the full PersonalJava™ platform.

20 Claims, 13 Drawing Sheets

COMPUTER-IMPLEMENTED SHARING OF JAVA CLASSES FOR INCREASED MEMORY EFFICIENCY AND COMMUNICATION METHOD

RELATED US APPLICATION

The present application claims priority of U.S. Provisional Patent Application Ser. No. 60/108,468, filed Nov. 14, 1998, entitled "JavaLayer: A framework for Implementation of PersonalJava on Aperios Audio Video Platform (AV/OS)," by Qiaoyun (Liz) Li.

BACKGROUND OF THE INVENTION

1. Field of the Invention

The present invention relates to the field of software architectures for a computer system running multiple Java Virtual Machines (JVMs). More specifically, the present invention relates to a software architecture that can be used for audio/visual digital devices including embedded systems.

2. Related Art

Many computer operating systems require Java for various applications including home networking applications, MPEG applets and other desktop and Internet applications. One such home networking application is the HAVi (Home Audio/Video Interoperability) application as described in a reference entitled "HAVI: an IT architecture for interoperability in the home network," by Rodger Lea and Aaron Ludtke, SRF97, which is cited herein as background. Given the wide range of target platforms and applications that can be hosted by computer operating systems, in both IT (Information Technology) and consumer electronics markets, it is desired that PersonalJava (pJava) be supported on various types of devices such as, for instance, set-top boxes, consumer electronic (CE) devices and digital televisions (DTVs).

Moreover, the implementation of the standard Java Virtual Machine (JVM) on personal computers (PCs) or on workstations allows applications to be developed in Java by programmers who do not necessarily understand the operating system of the host computer system. In one example, this host computer operating system is the Aperios operating system available from Sony Corporation. Because Aperios' AVIOS is a highly configurable, real-time and micro-kernel platform, it would be advantageous that highly compact and memory efficient implementations of the JVM be implemented on top of it. For instance, it would be advantageous to port PersonalJava to the Aperios's AVIOS environment. Heretofore, this has not been done for a number of reasons.

One problem is that PersonalJava does not currently support Audio Video (AV) applications, which need more flexible functionality to adequately handle certain functionality such as volume data handling and transfer, device and stream control management, message passing, event management and communication with native applications. Therefore, it would be advantageous to design and build a dedicated environment for the implementation of a Java system infrastructure which would help AV applications.

There are other problems with respect to running Java systems on dedicated environments, e.g., an embedded computer system or other intelligent electronic device. Namely, embedded computer systems do not have the memory resources required to support Java systems. FIG. 1 illustrates a software architecture where a single computer system is running multiple JVMs 11–14 simultaneously. Each JVM installs, into memory, its own copy of the Java classes which are required to allow the respective JVM to operate. For instance, JVM 11 installs classes 21 for its own use, JVM 12 installs classes 22 for its own use, JVM 13 installs classes 23 for its own use and JVM 14 installs classes 24 for its own use. However, many of the installed Java classes are copies of the same class, e.g., class A and class B are copied and are individually used by many of the JVMs. The size of these classes, and the fact that each JVM needs its own copy, makes it very difficult to run multiple JVMs simultaneously on a single computer system. This is especially true for embedded computer systems which lack robust memory resources. What is needed is a system and method for allowing efficient use of memory resources when operating Java on a dedicated environment.

Moreover, when Java systems are running on dedicated environments, there is presently no effective way to pass messages between native applications and JVM applications or between two or more JVM applications. What is needed is a system and method for allowing efficient message passing between native applications and JVM applications, or between two or more JVM applications, within a dedicated environment.

SUMMARY OF THE INVENTION

Accordingly, the present invention provides a system and method for allowing efficient use of memory resources when operating Java on a dedicated environment, e.g., an embedded computer system or other intelligent electronic device. The present invention further provides a system and method for allowing efficient message passing functionality between native applications and JVM applications, and between two or more JVM applications, within the dedicated environment. Specifically, what is disclosed herein is a novel class sharing model for minimizing the memory footprint of multiple JVMs running on a dedicated computer system, e.g., an embedded system. Embodiments of the present invention also include a model for mapping different physical devices installed with their own file management and a model for external applications to communicate with PersonalJava.

To reduce the memory footprint of the JVMs, a computer-implemented method and system are described for allowing Java classes to be shared among many Java Virtual Machines (JVMs) and this system includes a communication system allowing Java and native applications (or two or more JVM applications) to readily interoperate. Various features of JAVA, like "write once, run everywhere," compactness, standardized APIs (application program interfaces) and the availability of advanced tool kits all make JAVA a very attractive platform for applications. A software framework described herein, referred to as "JavaLayer," (or Java layer) allows various coexisting applications to share resources and provide an optimal run-time environment. The JavaLayer enables Java and native applications to interoperate easily, manage class sharing and aids by efficient garbage collection.

An implementation of the JVM on an operating system platform, e.g., the Aperios AV/OS, allows a variety of applications including desktop applications, applets and Internet based applications, home networking applications, MPEG applets, gaming, gaming applications and next generation audio visual applications to operate with the operating system. The present invention provides a shared memory pool (SMP) into which a JVM can store and register a particular Java class for subsequent use by itself or by other JVMs. The stored and registered Java class is accessible by other JVMs using the SMP and a Java layer class manager (JCM) that is implemented in software. The JCM requires other JVMs to access a key for the stored class in order to synchronize access to the Java class among several installed and operating JVMs of the computer system. By sharing common Java classes in this fashion, the memory resource overhead required to operate multiple JVMs on a common computer system is drastically reduced thereby allowing a multiple JVM platform to be operable on an embedded computer system.

A novel communication method is also disclosed for communicating information between a JVM application and a native application, or between two or more JVMs, using the computer system's operating system and the SMP. The novel communication method allows multiple JVM applications to communicate using the shared memory pool. These functions are incorporated into a JavaLayer that supports the full PersonalJava™ platform.

More specifically, in a computer system having a processor coupled to a bus, a memory device coupled to the bus and a display screen coupled to the bus, embodiments of the present invention include a method of sharing Java classes comprising the steps of: a) a first Java Virtual Machine (JVM) loading an instantiation of a first Java class into a shared memory pool; b) registering a name of the first Java class into a name table for the shared memory pool; c) a second JVM querying the name table to determine if the first Java class is stored in the shared memory pool, wherein the second JVM is operating on the computer system simultaneously with the first JVM; and d) the second JVM accessing and utilizing the instantiation of the first Java class from the shared memory pool in lieu of creating a separate instantiation of the first Java class for its own use.

DETAILED DESCRIPTION OF THE INVENTION

Figure 1:
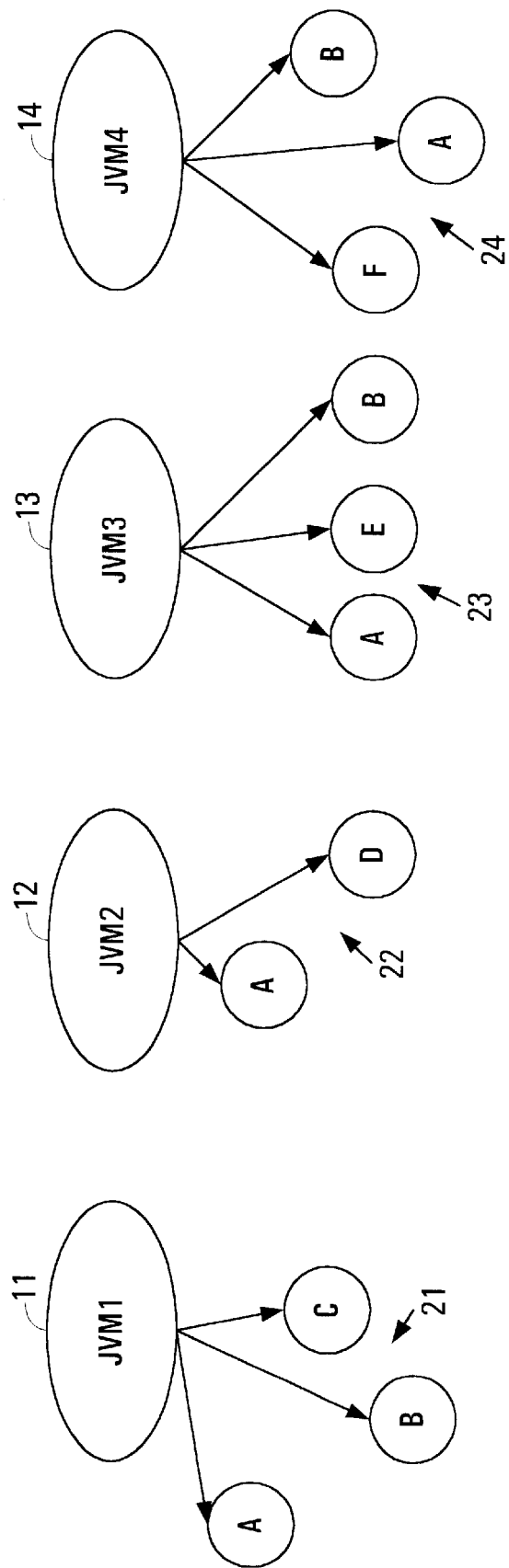
FIG. 1 illustrates a prior art software configuration of Java virtual machines (JVMS) including each JVM having its own separate memory allocation for Java class storage.

In the following detailed description of the present invention, a computer-implemented method and system for sharing Java classes across multiple Java virtual machines on the same computer system and a method for communication between Java and native applications (or between two or more JVMs), numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

The following documents are referenced as background material and as such are incorporated herein by reference: Aperios™ v.1.1.1 User Guide, Sony 1998; "HAVi: an IT architecture for interoperability in the home network," by Rodger Lea and Aaron Ludtke, SRF97; "The Java Virtual Machine Specification," by Tim Lindholm & Frank Yellin, Addison Wesley, 1996; and "With HotSpot, the JVM is faster than a speeding bullet," by Eric Armstrong, JavaWorld, Mar. 25, 1998.

Embodiments of the present invention include a dedicated framework, called JavaLayer, that allows various coexisting applications to share resources and provide an optimal run-time environment. The JavaLayer enables Java and native applications to interoperate easily, manages class sharing and aids efficient garbage collection. It also allows two or more JVMs to interoperate. In one embodiment, JavaLayer supports the full PersonalJava platform. An implementation of the Java Virtual Machine (JVM) on the Aperios AVIOS platform allows a variety of applications including desktop applications, applets and Internet based applications, home networking applications, MPEG-6 applets, gaming applications and next generation AV oriented applications to run on Aperios. Various features of Java like "write once, run everywhere", compactness, standardized APIs and the availability of advanced tool kits, all make this platform very attractive for applications.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer System 112

Figure 2:
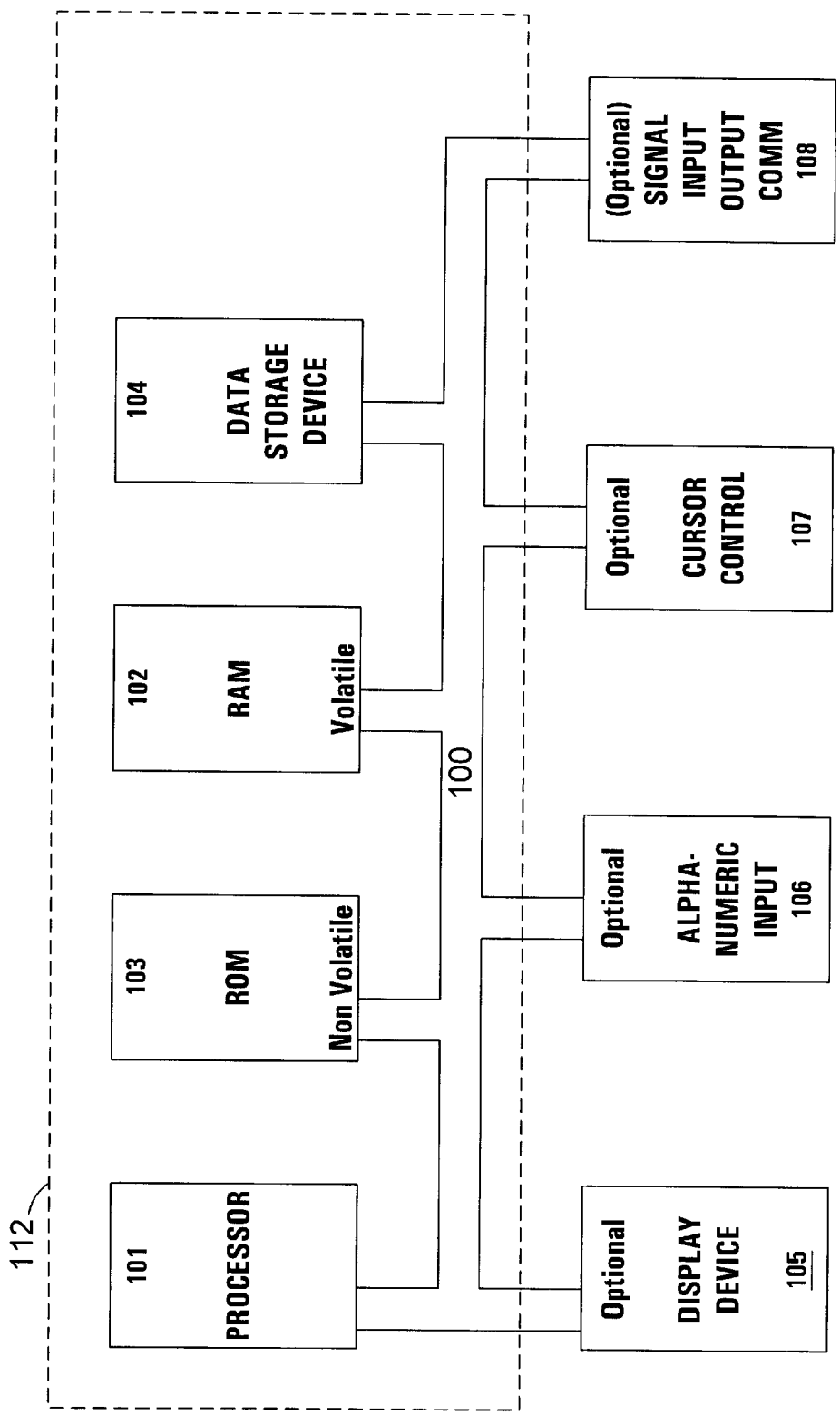
FIG. 2 illustrates a general computer system utilized in accordance with an embodiment of the present invention.

Aspects of the present invention, described below, are discussed in terms of steps executed on a computer system, also called embedded system, (e.g., process 410 of FIG. 10) for sharing Java classes. Within the present invention, the computer system can be integrated within a portable electronic device or system, e.g., a personal digital assistant, a portable computer system (e.g., a laptop, a palm sized device), a portable consumer based electronic device such as a mobile phone or car navigator. As an embedded system, the computer system can also be used as part of an Internet television system, a set-top box (STB), within a printer, in a digital video disk (DVD), an industrial controller, a telephone or within an instrumentation device. Although a variety of different computer systems can be used with the present invention, an exemplary general purpose computer system 112 is shown in FIG. 2. PersonalJava™ can be used as a software platform of system 112.

In general, computer system 112 of FIG. 2 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user. System 112 can also be referred to as an embedded system.

Also included in computer system 112 of FIG. 2 is an optional alphanumeric input device 106 including alphanumeric and function keys coupled to the bus 100 for communicating information and command selections to the central processor 101. System 112 also includes an optional cursor control or directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. Computer system 112 can also include an optional signal generating device 108 coupled to the bus 100 for interfacing with other networked computer systems. The display device 105 utilized with the computer system 112 is optional and may be a liquid crystal device, cathode ray tube (CRT), light emitting diode (LED), field emission device (FED, also called flat panel CRT) or other display device suitable for creating graphic images and alphanumeric characters recognizable to the user.

System and Software Architectures

Figure 3:
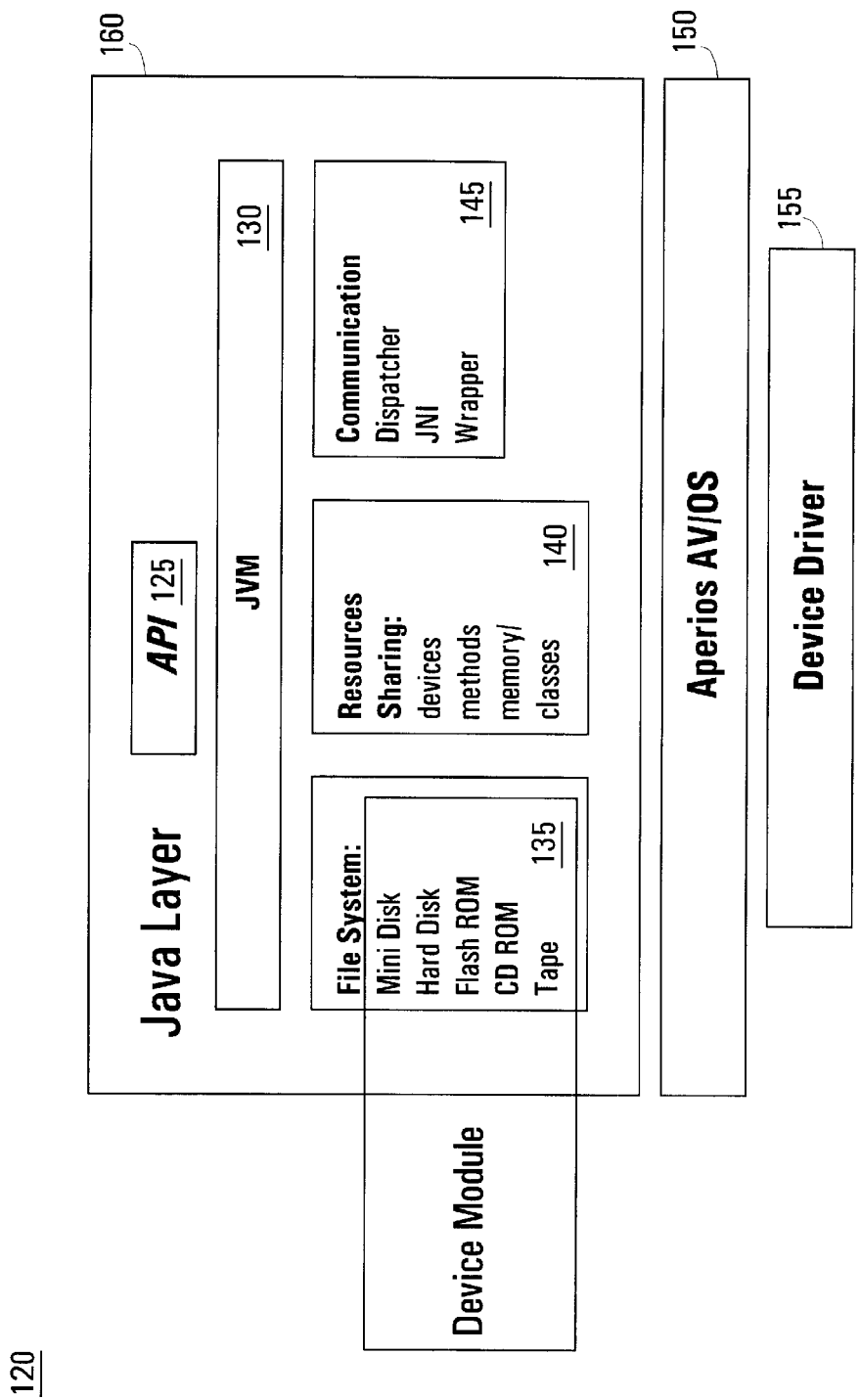
FIG. 3 is a logical block diagram of the system architecture of the computer system used by the present invention.

FIG. 3 illustrates a system architecture 120 that can be installed within the computer system 112 (FIG. 2). The present invention includes a shared memory pool (SMP) and JavaLayer Class Manager (JCM) for allowing registered Java classes to be shared among multiple Java Virtual Machines (JVMs) that simultaneously run on the system 112. By sharing basic Java classes, in lieu of maintaining a separate copy of each class for each JVM, the present invention is able to better utilize memory resources for the embedded computer system 112. A Java class, as described more fully below, contains both definitions and data and is implemented using Java byte codes which can be read by a Java interpreter. Byte codes are machine independent so that they can be executed on any machine.

Within the system architecture 120 of FIG. 3, the API layer 125 or application program interface is shown as the top layer. The API 125 is associated with a JVM 130. Generally, only one application is resident for a particular JVM 130. The device module 135 includes a file system which can use a mini disk, a hard disk, flash ROM, a CD-ROM and/or a tape storage device. Resources that are shared 140 include hardware devices, methods, memory and Java classes that are stored in memory (e.g., the shared memory pool). Communication 145 is performed using the Dispatcher, Java Native Interface (JNI) and a Wrapper. At the bottom layers are located an operating system (OS) 150, e.g., the Aperios AV/OS, and a device driver 155.

Figure 4:
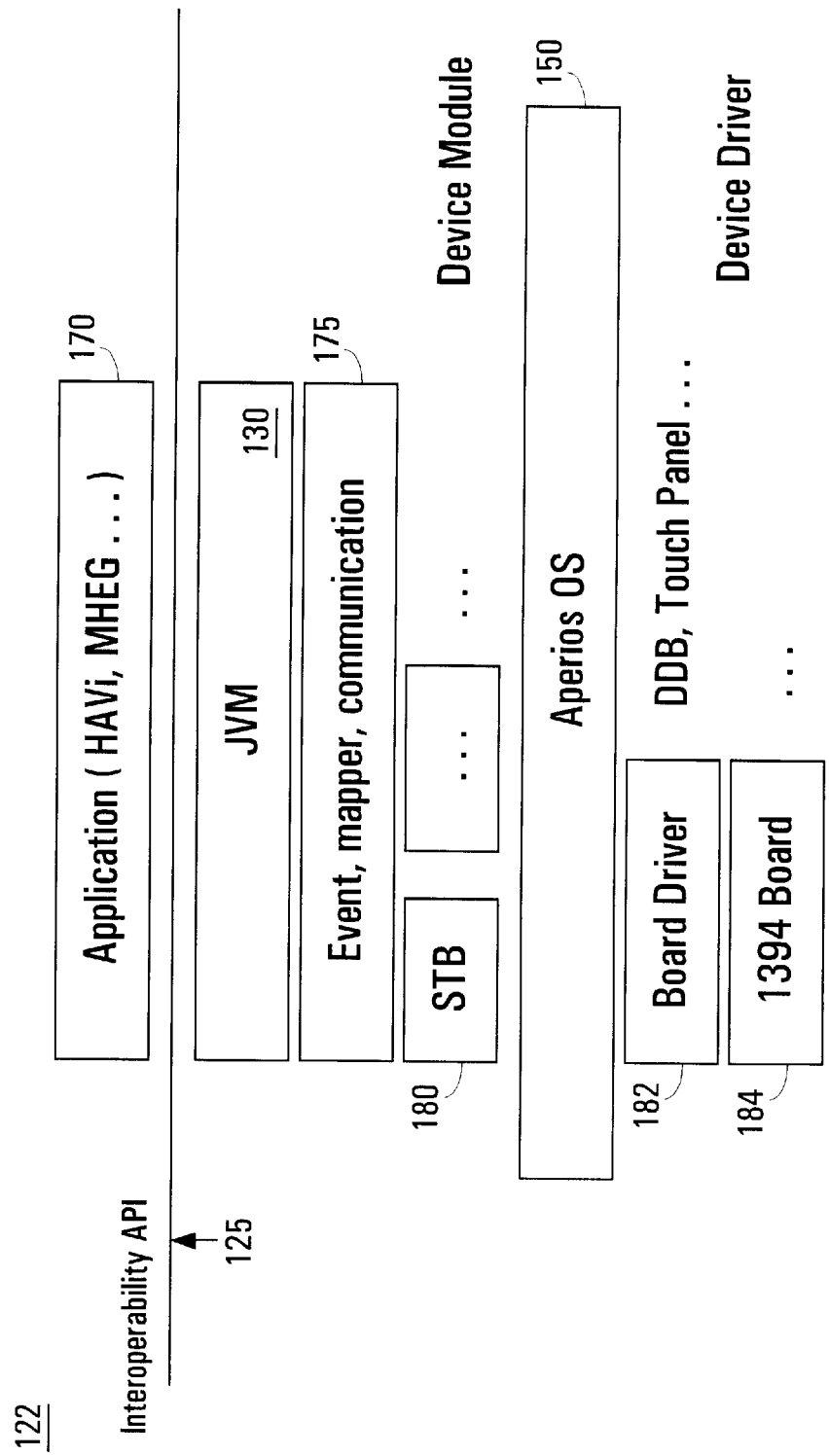
FIG. 4 is a logical block diagram of the JavaLayer software model used by the computer system of the present invention.

FIG. 4 is a logical block diagram of the JavaLayer software architecture 122 of the computer system in accordance with an embodiment of the present invention. At the top layer is the application 170, e.g., a HAVi application, an MHEG application, etc. Between the application 170 and the associated JVM 130 is located the interoperability API 125. At layer 175 is the event, mapper and communication portions of the JavaLayer 175. The device module can include a set-top-box 180. The operating system is shown as layer 150. The device drivers can include a board driver 182 and a serial communication driver, e.g., a 1394 board 184. Although one JVM is shown in FIG. 3 and FIG. 4, multiple JVMs are supported in accordance with the present invention.

Figure 5:
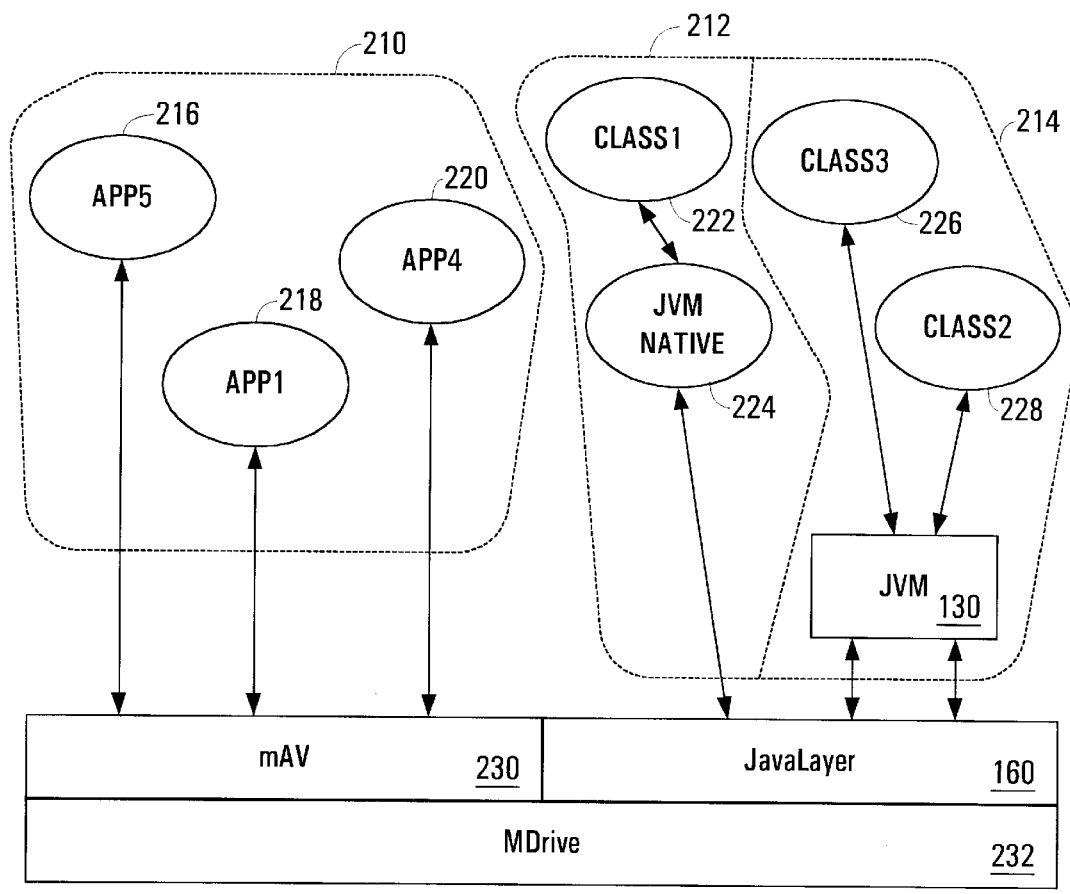
FIG. 5 is a logical block diagram of the multi-JVM JavaLayer in accordance with an embodiment of the present invention including the metaspaces with which it interoperates.

Shared Memory Pool for Sharing Java Classes
Between Multiple JVMS Running Simultaneously FIG. 5 illustrates the JavaLayer 160 and the metaspaces with which it interworks. This architecture supports multiple JVMs simultaneously within the same computer system 112. For instance, JVMs 224 and 130 are simultaneously supported. As shown, each JVM interacts with certain Java classes 222, 226 and 228. The arrows show the direction of communication between objects and the dash-lined boxes illustrate the relationship boundaries for the application programs. When implementing a Java environment on an audio video platform, developers have to deal with the features of the JVM 130, Java classes, and audio video (AV) media applications. The JavaLayer framework supports the application implementor in all the areas of Java and AV media applications. The framework consists of a set of constructs and rules regarding the use of the constructs. The constructs are a combination of C++classes, Aperios active objects and Aperios meta objects. Other applications 216–220 are shown on top of the mAV metaspace 230.

Figure 6:
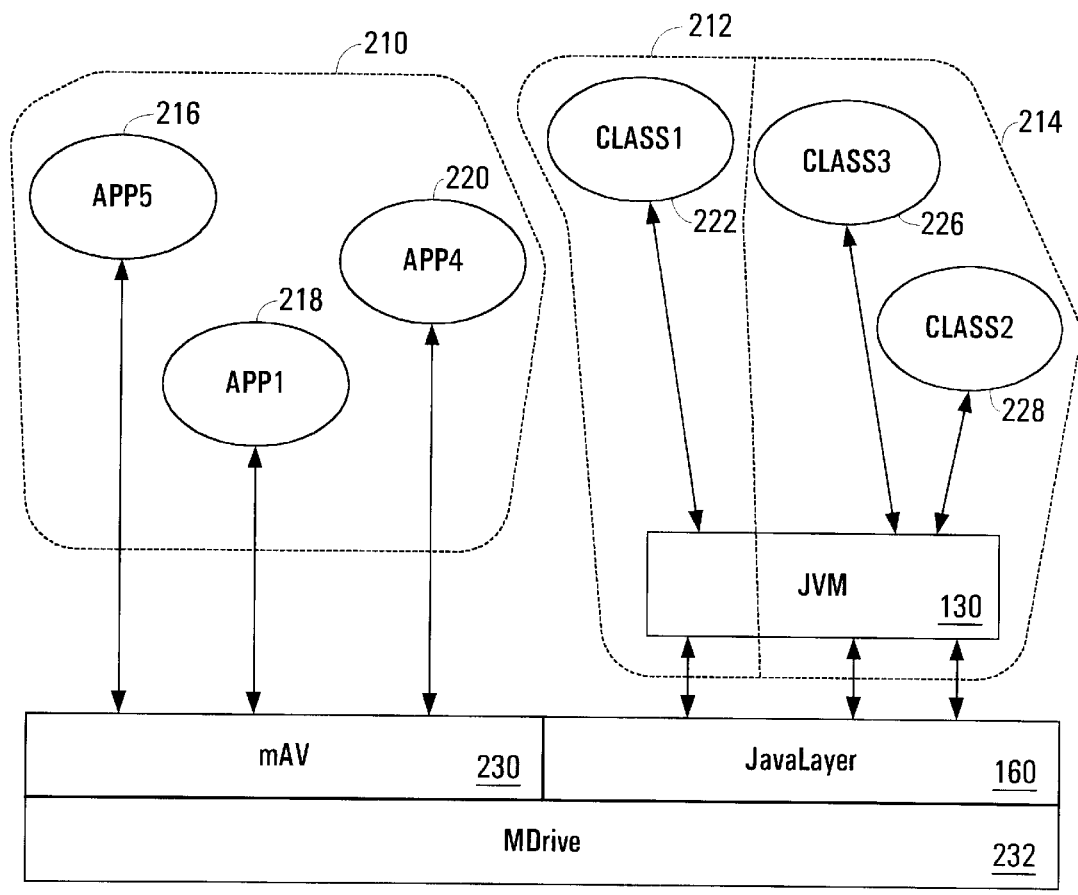
FIG. 6 is another logical block diagram of the JavaLayer architecture supporting multiple applications on one JVM simultaneously in accordance with an embodiment of the present inventions.

FIG. 6 illustrates another architecture used for memory-limited devices.

Specifically, FIG. 6 illustrates the JavaLayer 160 and the metaspaces with which it interworks. The architecture of FIG. 6 supports multiple applications 222–228 (Java byte code classes) on one JVM 130 simultaneously. The arrows show the direction of communication between objects and the dash-line boxes represent the application boundaries. Also shown are applications 216–220 running on mAV metaspace 230.

The JavaLayer 160 supports two architectures as shown in FIG. 5 and FIG. 6. JavaLayer 160 runs in the mAV metaspace 230 in Aperios operating system v1.1. In Aperios, mDrive layer 232 is the metaspace that support device drivers and handles interrupts and mAV metaspace 230 is the metaspace for AV applications. Libraries in the mAV metaspace (which implement the JavaLayer 160) can communicate with drivers in the mDrive metaspace 232 for storage, display and other device functions. In accordance with the present invention, when a class is loaded by a Java application running over the JavaLayer 160, this class is placed in common space (e.g., the shared memory pool) and is accessible by every JVM object. As shown in FIG. 5, Javalayer 160 supports multiple JVMs running for devices which have enough memory. FIG. 6 shows the architecture which supports multiple applications running on one JVM 130 simultaneously for memory-limited devices. In accordance with the present invention, a platform is described that allows multiple JVMs to run on a memory limited platform.

The JavaLayer framework is used to support JVM for multiple applications by sharing their basic class memory, garbage collection and a scheduler. Compared to development on a "bare" Aperios, a more flexible and attractive development environment is provided and a shorter debugging phase is allowed mainly due to the features of the JavaLayer Framework. The JVM is primarily PersonalJava (pJava), but it can also be any other embedded JVM written specially for the target device. JavaLayer can run multiple JVMs simultaneously on AVIOS.

Herein, a JVM is a virtual machine which contains an execution space, an execution engine, a class loader and a Java stack. A JVM can share classes and potentially an initialization stack with other JVM or create its own initialization stack. A JVM typically operates on Java byte codes. A created JVM can run several Java applications in parallel or serially by using the designed method. In addition, users do not need to explicitly create a thread for JVM to run. The JVMs can potentially deploy different garbage collection and downloading mechanisms for different application. The JavaLayer framework supports a set of APIs with which applications can create a JVM, initialize a shared or non-shared class library, create a mapper for the class loader and perform event handling for special devices.

What is disclosed herein is a class management model for minimizing the amount of memory required for storing and maintaining the Java classes through class sharing and for providing mapping model to map different physical devices using their own file systems and file management APIs. Furthermore, a facility is provided which allows native applications to communicate with PersonalJava. As FIG. 5 depicts, the applications 222–228 running on JVM can communicate with each other as well as with applications 216–220 running on mAV 230 by using a combination of message passing and shared memory.

Figure 7:
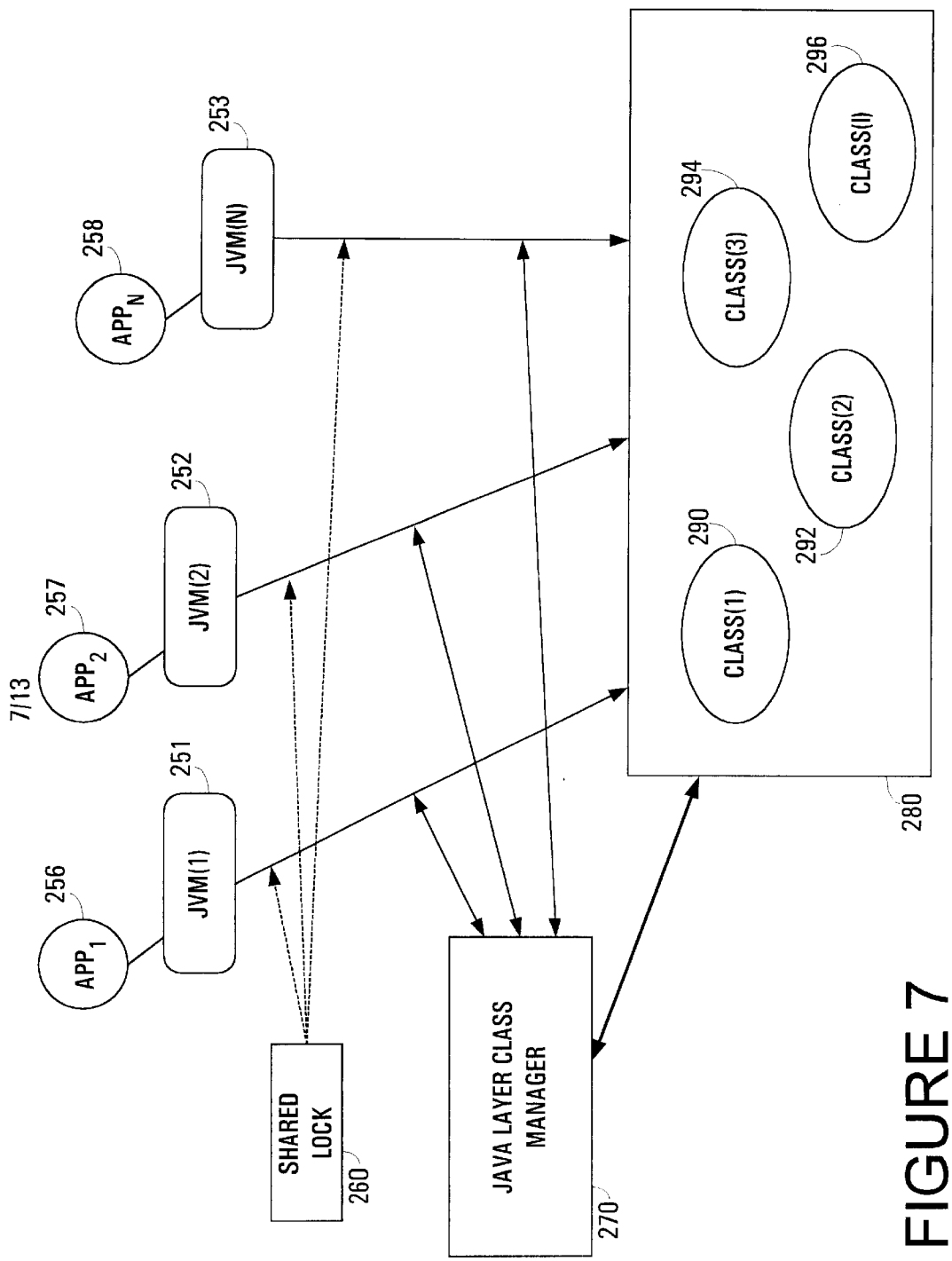
FIG. 7 is a block diagram of the JVMs interfacing with the shared class memory pool of the present invention using the JavaLayer class manager.

With reference to FIG. 7, the shared memory pool 280 is shown interacting with a JavaLayer Class Manager (JCM) 270 and a shared lock 260. When a JVM initializes its class library, the JCM 270 uses the shared lock 260 to serialize access to the shared memory pool 280, also called the class pool 280. The shared memory pool 280 is an area of memory that is established for storing Java classes and other information to be shared across multiple JVMs which are running simultaneously on system 112. In this way, the shared lock 260 is used by the present invention for serializing access of shared Java classes between multiple Java applications 256–258.

Using the shared memory pool 280 of FIG. 7, a number of JVMs 251–253 can then access the same library for different operations without requiring that a separate, individual copy of the Java class be stored for each JVM as done in the prior art. In practice, the Java classes that every application needs for operation are loaded in the shared memory pool 280 in one memory space. Every block of that memory space has a lock down (shared lock 260). If a JVM wants to access the stored Java class in the shared memory pool 280, then it must first obtain the lock associated with the desired Java class. Some of the basic Java classes that can be shared between multiple JVMs are the basic Java class, for example, Java 10, Java language, and Java beans which can also have other classes included within. Some of these Java classes can consume as much as 2 Megabytes of memory each. These Java classes contain basic data required for Java. In some other programming languages, apart from Java, classes are referred to as libraries.

For performance reasons physical copying and moving a class is avoided as much as possible during operations. Therefore, all classes 290–296 are managed by the central JCM 270 meta-object which manages the memory pool 280 of class cells that hold all class memory. This memory pool 280 is shared between the multiple JVMs 251–253 and all JavaLayer modules as shown in FIG. 7. The JCM 270 allocates memory to the classes within the shared memory pool 280 and divides the shared memory pool 280 into blocks for this purpose. The individual blocks are then managed by the JCM 270. If a JVM wants to share a class, it first checks with the JCM 270 which then references a name table and the lock for the class. The JCM 270 then forwards the address of the class to the requesting JVM when the lock is free. The JVM can then access the shared Java class.

As shown in FIG. 7, an application can be associated with each JVM. As shown, application 256 is associated with JVM 251, application 257 is associated with JVM 252 and application 258 is associated with JVM 253. Requests from the JVM to access Java classes 290–296 are processed by the JCM 270. A shared lock 260 used so that only one JVM can access any particular Java class at any time. In one embodiment, each Java class stored in the shared memory pool 280 has a read lock and a write lock. Typically, a Java class is written by only one JVM, e.g., the originator or initiator JVM, and then can be read (e.g., shared) by the other JVMs once the associated read lock is obtained. Once a class is written into the shared memory pool 280, it becomes registered with the JCM 270 within a name table. The JCM 270 can then use the name table to respond to JVM initiated requests for access to particular Java classes.

The JavaLayer framework offers APIs to the JCM 270 for JVMs to perform operations on various classes and access the memory contents of the classes. The JavaLayer assumes a basic container, called class cells, that is used to support class loading. Class cells are dynamic memory buffers, shared by JVMs in a shared mode, and used for class manipulations avoiding physical copying of class as much as possible. When physical drivers and application objects use the same class cells, they can share the class cell and effectively result in a JVM architecture that does not contain copies.

Figure 8:
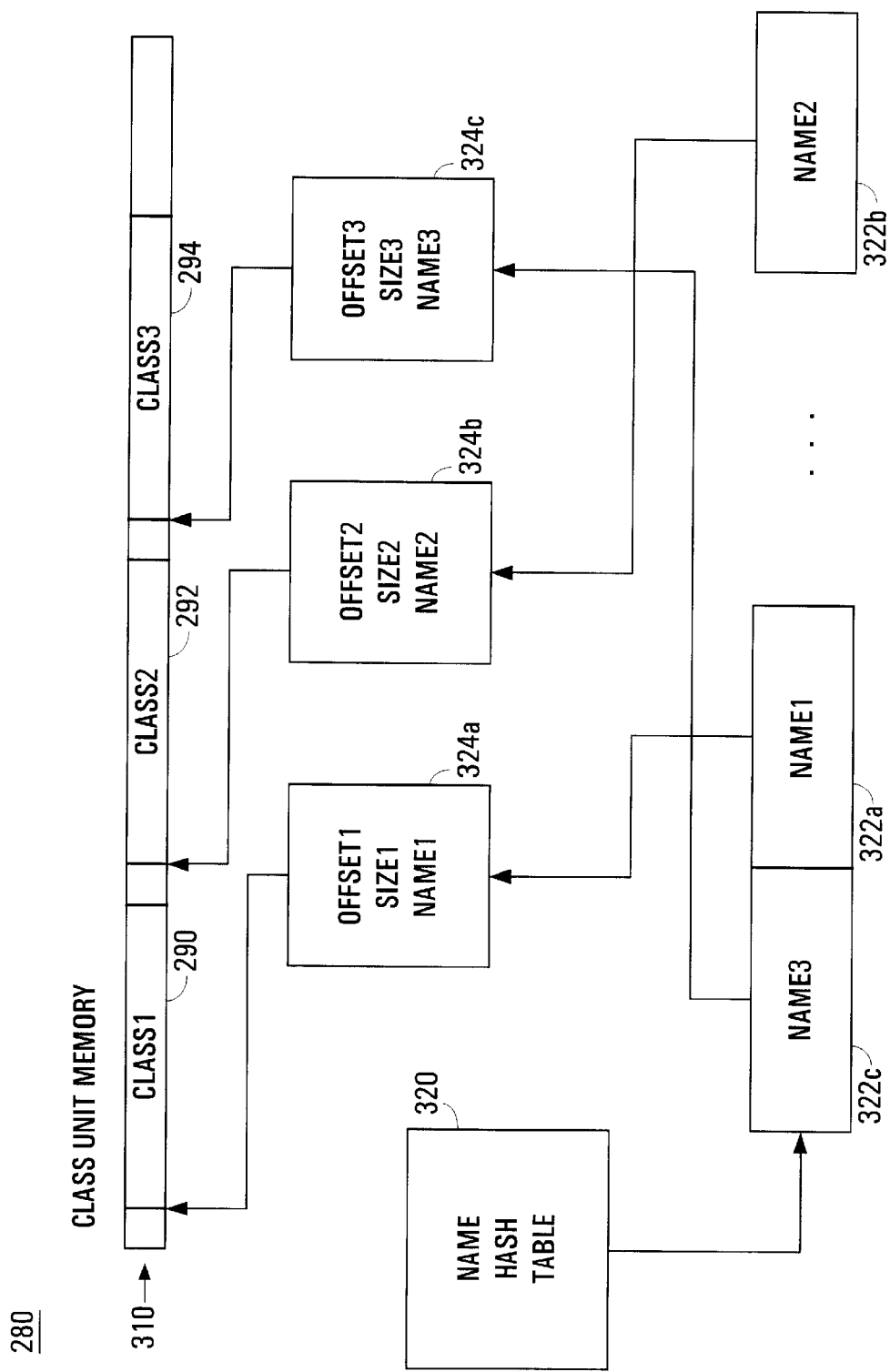
FIG. 8 illustrates the physical and logical memory organization of the class sharing system of the present invention.

FIG. 8 illustrates physical and logical memory organization of the classes within the memory pool 280. To avoid the physical copying and moving of classes when operations are performed on the classes by multiple JVMs 251–253, these classes are stored in memory 310 in the manner as shown in FIG. 8. The class is stored in variable sized class cells or "blocks" 290–294. The actual class is constructed by linking cells together at certain offsets in the class cells as shown by 324a–324c. The size of any block can be dynamically adjusted based on the size of the stored Java class. The link contains the name of the class, its size and the offset from the start. The entries in the name table are shown as 322a–322c. A hash table 320 is used to reference the position within the name table for an enumerated Java class. The name is then used to reference an offset which points to the memory position of the class within the shared memory pool 280.

Managing the class cells as shown in FIG. 8 offers the following advantageous. Class data does not have to be stored contiguously in memory 310. Also, a class cell can contain holes and therefore not all the data needs to be present. This is especially useful when reassembling PDUs. Also, cells can be shared between class cells so that copying data from one class cell to another is done by maintaining references and reference counters instead of physically copying the data. Adding data to and removing data from a class cell can be done without physically copying or moving the class cells contents. These features lead to a zero-copy architecture, provided that the same memory management techniques are also used by the device drivers and the applications. A detailed example of the manner in which the JCM 270 (FIG. 7) manipulates the class cell data is given further below.

Without class sharing of the present invention, it is difficult to invoke several JVMs for memory-limited devices such as set-top-boxes, PDS, screen phone, etc. However these devices need to support multiple applications based on Java. The JavaLayer's solution is to support multi-applications on one JVM. The technique for supporting multi-applications on one JVM is to prevent the global classes or static classes from being written by more than one object. The prior art Java systems do not support the protection. The JavaLayer of the present invention provides a write-lock (WL in short) for each class cell. These are maintained by the shared lock 260 of FIG. 7.

Figure 9:
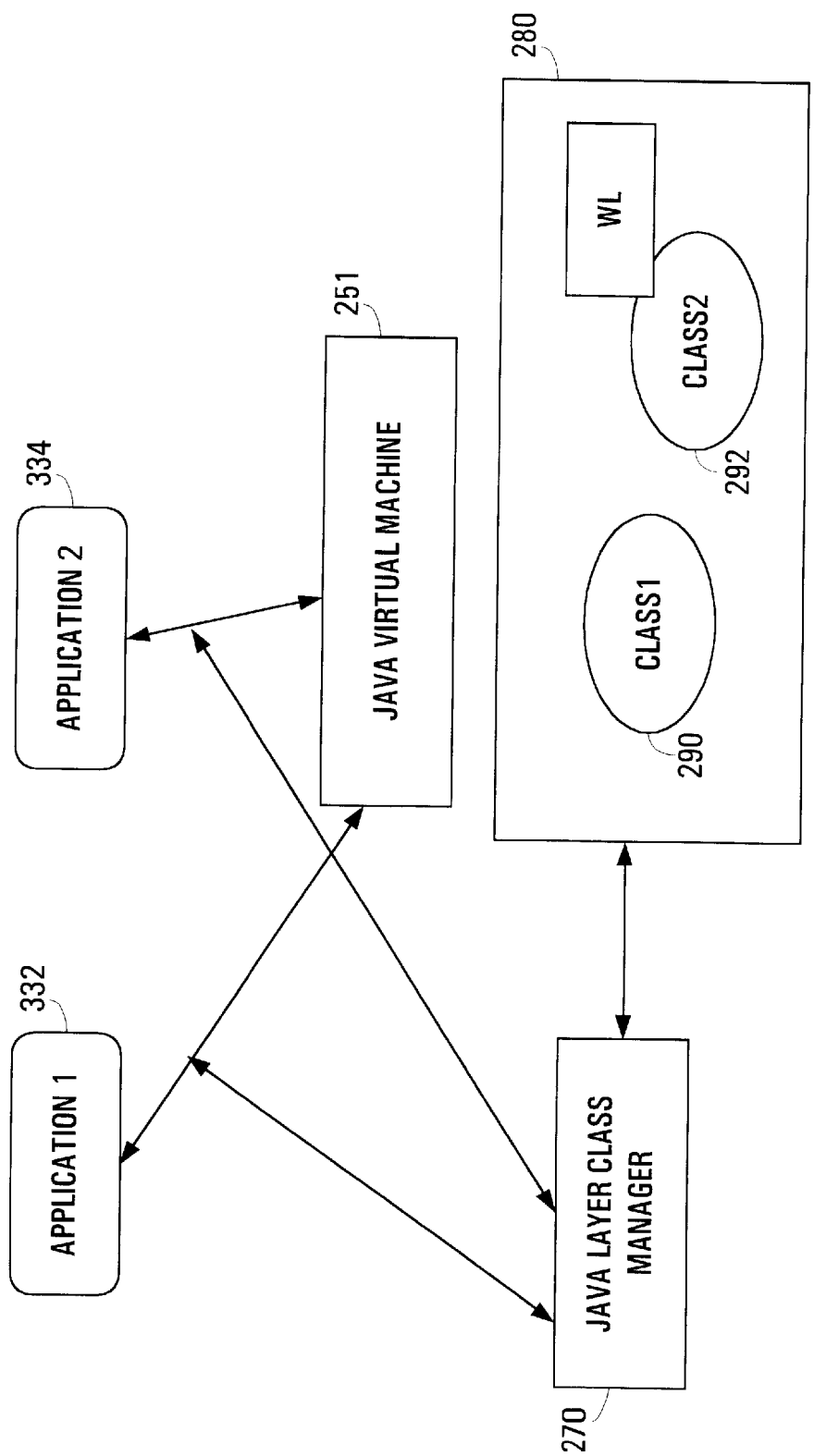
FIG. 9 illustrates an example of class sharing of the class memory pool across multiple applications using the JavaLayer class manager (JCM) in accordance with the present invention.

As shown in FIG. 9, the JCM 270 locks the class cells which are static classes or static variables to restrict the write-right. It gives the write-right to the object which is writing the static classes. JavaLayer allocates the class cell to the static classes with one write-lock (WL), which is used to record the object name. The highest priority is given to the writing object to prevent dead lock.

The JavaLayer guarantees the thread which holds the WL not being blocked or suspending before it releases the WL. Therefore, access to a JVM to write a Java class to the shared memory pool 280 is managed by the JCM 270 using 20 the write lock. Access to read a stored Java class from the shared memory pool 280 is managed by the JCM 270 using the shared read locks 260.

FIG. 9 illustrates that any access to the shared memory pool 280 by the application 334 goes through the associated JVM 251 for that application. The JVM 251 then accesses the JCM 270 which manages access to the shared memory pool for the Java classes 290, 292 that are stored therein.

Figure 10:
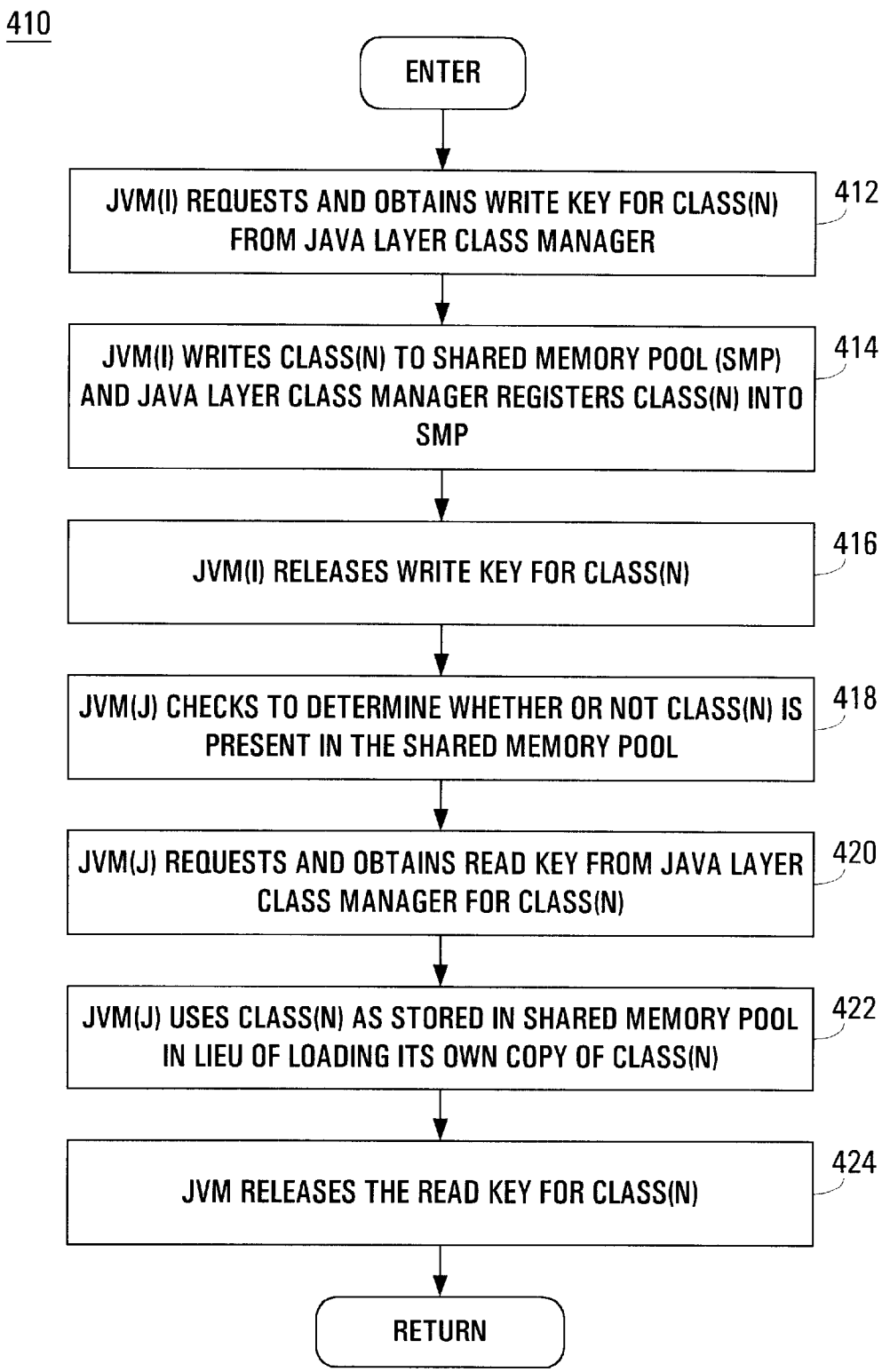
FIG. 10 is a flow diagram illustrating steps of the class sharing process of the present invention using the shared memory pool and the JavaLayer class manager to share classes between multiple JVMs.

FIG. 10 illustrates steps in a process 410 used by the present invention for sharing Java classes of the shared memory pool. At step 412, a particular JVM, e.g., JVM(I), requests and obtains the write lock (e.g., "write key") (WL) to write a class, e.g., class(N), into the shared memory pool. The WL is managed by the JavaLayer class manager (JCM). When the WL is granted to JVM(I), then at step 414, it writes class(N) to the shared memory pool and the JCM registers the class name into the name table and then links the table entry with the proper offset and size in memory so that the class can be subsequently accessed. At step 416, JVM(I) then releases the write lock and class(N) is registered in the shared memory pool.

The remainder of the steps of FIG. 10 illustrate the procedure used for accessing the stored class(N) that resides in the shared memory pool. At step 418, a JVM, e.g., JVM(J), checks with the JCM to determine whether or not a class(N) is stored in the shared memory pool. It is appreciated that JVM(I) and JVM(J) are both running simultaneously on system 112 (or could be the same JVM). The above determination is typically done by an instruction whose function is to establish class(N) for the JVM. During the establishment function, before the class is written into memory, a check is first done to determine if the class has already been established in the shared memory pool by another JVM. At step 420, if class(N) exists in the shared memory pool, then JVM(J) requests and obtains the read key for class(N) from the JCM. At step 422, JVM(J) then accesses class(N), as needed, from the shared memory pool instead of copying its own instantiation of class(N) in memory. At step 424, JVM(J) then releases the read key for class(N) when done with this class. It is appreciated that steps 418-424 can be repeated for other JVMs that are simultaneously running on computer system 112. Memory is thereby saved because each JVM that needs class(N) can share the instantiation of this class as established by JVM(I) without copying its own version.

PersonalJava uses a Unix-like file system for class loading. Because most RT operating system platforms do not support the Unix-like system, the JavaLayer framework supports a general file system which is mapped to the real device drivers. The class mapper 175 (FIG. 4) is designed to support most standard storage drivers such as remote file systems for Internet files or a Mini Disk system for local media in the SMAP (Single Media Active Project) group and is analogous to a VFS layer in Unix.

Currently, the storage media is divided into three types. The first type is Local medias, such as Mini Discs, tapes, CDs. Each of the media has its own storage system. The second type is Internet-based hosts. The classes can be stored in a local or remote host server which is linked to the target board by the networking. The third type are ROMs. The basic system classes and AWT classes are romized to the target board. Whatever medias the platform uses for storage of the Java classes, a standard retrieval API is necessary for the JVM to access the classes. JavaLayer framework provides a Mapper 175 which supports standard APIs for class management.

The native software dealing with the hardware runs on the mAV metaspace 230 (FIG. 5 and FIG. 6). JavaLayer communicates with these devices by using a Dispatcher class 145 (FIG. 3). The standard class loader API is defined in Table I. For example, Table II illustrates an exemplary mapper that is designed for a remote file system mapping to the Unix-like file system.

TABLE I

```
class Unix-FileSystem {
    FILE*fopen(const char *filename,
        const char *type);
    size_t fread(void * ptr, size_t size,
    size_t nitems, FILE *stream);
    . . .
}
```

TABLE II

```
typedef struct functab {
    char*  name;
    void*  ftlnc;
} flinctab;
flinctab Mapper = {
    { "fopen_15Unix_FileSystemFIPvUiPUi", rfs_open},
    { "fopen_15Unix_FileSystemFIPvUiPUi", miniDisk_open},
    { "fopen_15Unix_FileSystemFIPvUiPUi", flashRom_open},
    . . .
}
```

A mapper generator is designed for the automatic mapper generation by setting JVM class loader type.

Communication Management Using the Shared Memory Pool

Communication management using mAV's communication mechanisms is now discussed. The shared memory pool 280 can be used for message passing between applications. For instance, a native application can use the JavaLayer to communicate with a Java application. The JavaLayer framework supports communication between Java execution spaces and native applications running on AVIOS or some other metaspace in Aperios using the Dispatcher 145. The Dispatcher class 145 organizes programs as a collection of actions, each of which is invoked upon receipt of a message. A program registers a set of methods which the dispatcher calls in the context of its threads when a message arrives. In addition, a Java Dispatcher class 145 can be extended to support Java and can be used for AV applications. For instance, JVM can support an API that accepts the Dispatcher 145 from the Aperios operating system 150 and invokes itself so that it can run in the application (JVM). The API interfaces between the JVM and the operating system 150 (FIG. 4).

Figure 11:
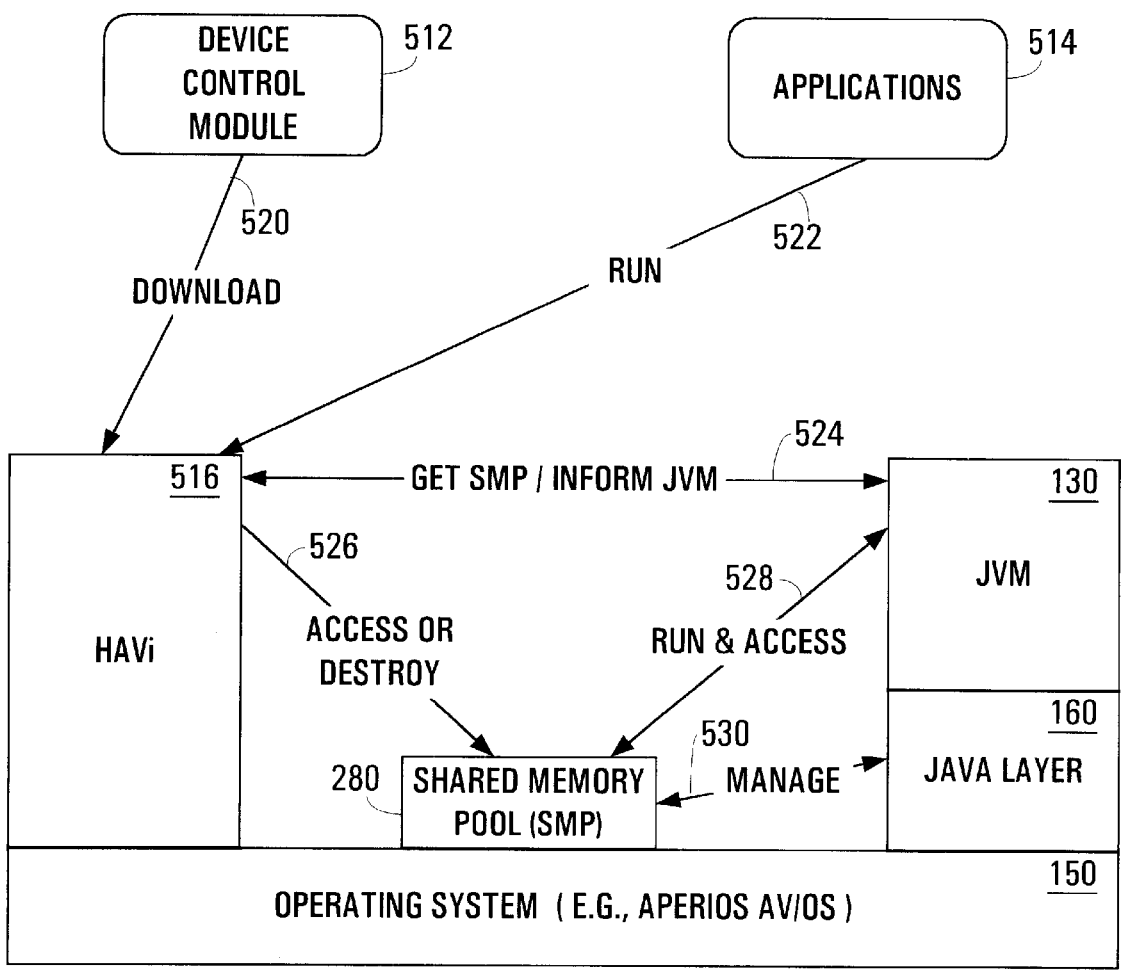
FIG. 11 illustrates a logical diagram of real-time coordination between native applications and a JVM in accordance with the message transfer method of an embodiment of the present invention.

Refer to FIG. 11. Within the communication method of the present invention, real time coordination is allowed both between JVM and native applications and between JVMs via the shared memory pool 280 for an embedded system. FIG. 11 illustrates an example system 510 for coordination between a JVM 130 and native applications 516. In this example, Home Audio/Video Interoperability (HAVi) application 516 needs to download a Device Control Module (DCM) 512 to install a device and control it. HAVi 516 first runs an application 514 and this application 514 needs a new device. Therefore, HAVi 516 downloads the device DCM 512, as shown by 520, and stores it in the shared memory pool 280 of the present invention via interface 526. After that, HAVi 516 informs the JVM 130, as shown by 524, to run the DCM module to install the new device. The JVM 130 then accesses the module that is stored in the shared memory pool 280 via 528.

In the above fashion, the shared memory pool 280 is providing a message communication pathway between the native application and the JVM. Typically, the message from the native application to the Java application is processed using help from the operating system's (e.g., Aperios) message passing abilities. A target code in the message can be used to identify whether the message is for a Java application or for a native application. If the message contains a Java code, then the operating system will communicate with the JVM.

HAVi 516 of FIG. 11, the shared memory pool 280 and the JavaLayer 160 interface with the operating system 150 and the JVM 130 interfaces with the JavaLayer 160. Havi 516 can access or destroy contents of the shared memory pool 280 via interface 526. The JVM 130 can run and access information of the shared memory pool 280 via interface 528. JavaLayer 160 provides management via the JCM 270 as represented by interface 530 in FIG. 11. Associated with JavaLayer 160, there is the shared memory pool (SMP) manager, also called JCM 270 and a JVM manager.

In accordance with this example, the JCM 270 provides the following services as shown in Table III below.

TABLE III

| Service Value | Parameters | Return |
|---|---|---|
| SMPManager::GetSMP | (size) | MemoryID |
| SMPManager:: GetsMpFreeSize | | size |
| SMPManager::GetSMpStatus | (MemoryID, Offset) | RUN, COMPLETE, FAIL |
| SMPManager::GetSMPDestroy | (MemoryID) | FAIL, SUCCESS |

The JVM manager provides the following services as shown in Table IV below:

TABLE IV

| Service | Parameters | Return Value |
|---|---|---|
| JVJMManager::Execute | (ModuleName, MemoryID, Offset), | FAIL, SUCCESS |
| JVMManager::SetStatus | (MemoryID, Offset, Status) | FAIL SUCCESS |

Figure 12:
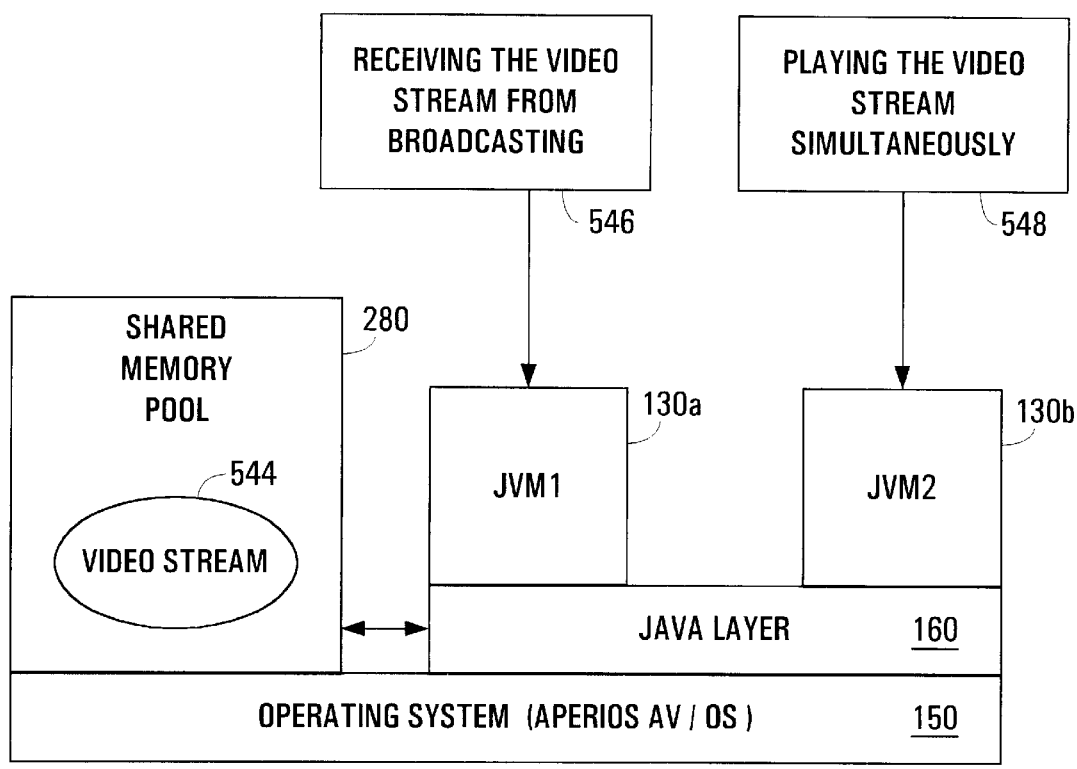
FIG. 12 illustrates a logical diagram of real-time coordination between two JVMs in accordance with the message transfer method of an embodiment of the present invention.
Figure 13:
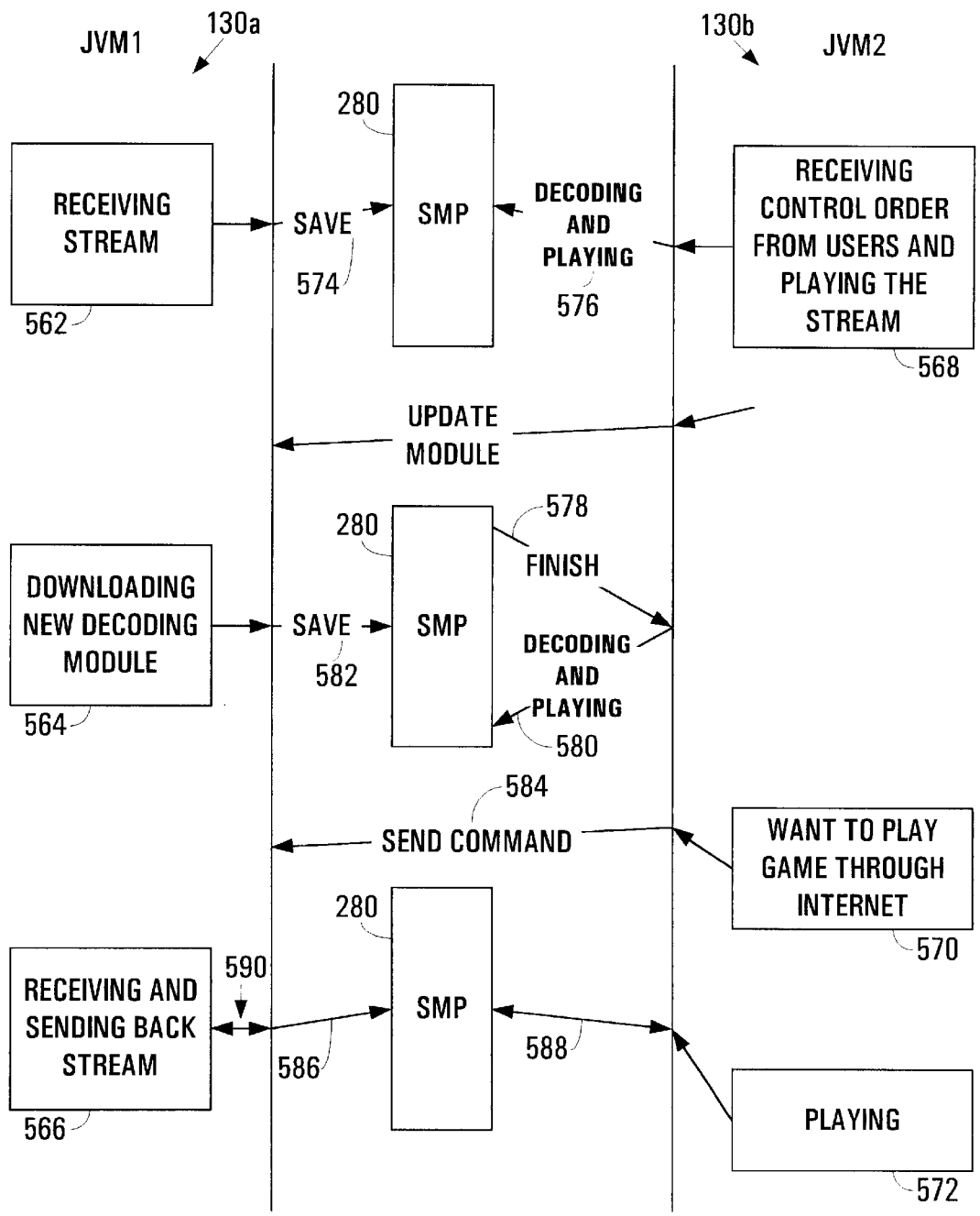
FIG. 13 illustrates a timing diagram of events of the real-time coordination between two JVMs in accordance with the message transfer method of an embodiment of the present invention.

FIG. 12 and FIG. 13 illustrate an example of coordination between several JVMs using the shared memory pool 280 of the present invention. With reference to FIG. 12, a first JVM 130a and a second JVM 130b are shown interfacing with the JavaLayer 160. The first JVM 130a is receiving a video stream from a broadcasting source 546 and the second JVM 130b is playing the video stream simultaneously 548 to some rendering device (e.g., a DTV). The first and second JVMs are communicating the video stream 544 using the share d memory pool 280, with the first JVM 130a writing into the shared memory pool 280 and the second JVM 130b reading from the shared memory pool 280. In home networking, the first JVM (called JVM1) 130a is running an application 546 for receiving the video stream from a broadcast and decoding the stream in the shared memory pool 280. The second JVM (called JVM2) 130b was receiving user's control and playing the stream.

FIG. 13 illustrates a timing diagram of events occurring between the coordination of the first JVM 130a (on the left) and the second JVM 130b (on the right). At 562, the first JVM 130a receives the video stream and by 574 it saves this information into the shared memory pool (SMP) 280. The second JVM 130b, under user control, decodes and plays back this video at 568 using interface 576. At 564, the first JVM 130a receives a new decoding module that is downloaded and saved to the SMP 280. The second JVM 130b then decodes and plays the new module as shown by 580. At 584, the second JVM 130b sends a command to play a game through the Internet as instructed by user control 570. At 566, the first JVM 130a receives and sends back a stream 590 in response to the Internet game. At interface 586, information is both saved and retrieved by the first JVM 130a. The second JVM 130b then supports game playing 572 by interfacing with the SMP 280 to provide interoperability 588. In all cases of FIG. 13, the shared memory pool 280 is used as an intermediary in the communication method.

Event Handling is described. DeviceEvent is the base interface for events in the JavaLayer framework. In order to support the Java AWT, event model, an implementation of DeviceEvent, is required to sub-class java.util.EventObject. Device events asynchronously deliver information about keyboard input, screen touch, remote control. To receive events, an object implements the device listener interface and uses the "add device event" method to the event queue. JavaLayer provides an deviceEventMapper to map different devices to the standard event handling interfaces. The definition is shown in the list of Table V.

TABLE V

```
classAV_EvenHandling {
    Position    x, y;
    EventType   evType;
    Event       *queue;
    void (*deviceEvenMapper(DeviceID dID)) (void);
    ...
}
typedef struct functab {
    DeviceID    dID;
    void*       func;
} Device_Func_tab;
Device_Func_tab DeviceMapper = {
    {Keyboard, KeyboardHandling},
    {RemoteController, RemoteControllerHandling},
    {TouchPanel, TouchPanelHandling},
    ...
}
```

An example implementation of a JVM within the AV/OS operating system is presented below. The syntax of the list of Table VI is described as below.

Regarding the syntax address server, the JVM uses the host of "serverHost" as a server to download classes. The target devices connect with the host by the Internet. Regarding the syntax version ver, this records the WM version information. Regarding the syntax stack stackentry, this records the JVM stack entry. Regarding the syntax JVM *share, this is the shared JVM point. If it is not NULL, the stackentry is NULL. The size_t heap is the heap size for this JVM. Here, the "ClassLoader" is shared.

The syntax static JVM *Create (size_t heap, Version ver, uint32 threadopts, JVM *share) constructs a new JVM with a new running thread and the heap size. It implicitly initializes basic Java Classes, with pJava version information and also checks whether the version is compatible with the implemented JVM or not. With the "share" parameter, the WM does not initialize Java Classes but shares Class Stack with another JVM pointed by param share. Two JVMs, which are expected to share the classes stack, should be compatible versions and synchronized. This parameter can be pointed only at the creating time. Otherwise, the JVM owns an independent Class Stack by calling to initialisejavaClass (uint32 level). Users initialize Class Stack explicitly from ROM/RAM/Flash memory. This method also can change the current JVM to a not-sharing JVM from a sharing status. Upon successful completion, the pointer to the new JVM is returned. Otherwise NULL is return.

The syntax initializeJVMclass(class, method) is used to establish a class for the JVM. If the class already exists in the shared memory pool 280, then this command does not generate another a copy of the class within the shared memory pool 280 but rather uses the copy that already exists there. If the class does not exist within the shared memory pool, then this command generates the copy of the class into the shared memory pool and registers the class with the JCM 270. The command executeJavaClass( ) is used for message sending.

Regarding the syntax, status Destroy( ), it is used for destruction, all activities in the JVM are explicitly terminated and destroyed. The initialized class stack also is freed. If there are any other JVM is sharing class stack with the current JVM, the destruction is pending until the release of the class stack. The syntax * void executejavaClass (char * className, void * args[ ]) represents the method for notation of running "application class." For example, the JVM runs the application bytecode class "HelloWorld.class", prints out "Hello World" if it is used as:

executeJavaClass ("HelloWorld", "main")

TABLE VI

```
class JVM {
    static JVM * Creat( );
    static JVM * Creat(size_t heap, Version ver,
                      JVM *share, Address server,
                      Class Loader cl_type);
    Version     ver;
    Stack       stackentry;
    JVM *       share;
    size_t      heap;
    enum ClassLoader {
                MD,
                rfs_FILE
                ROM,
                Download
    } cl_type;
    Address server;
    InitializeJVMclass(class, method);
    executeJavaClass( );
    status Destroy( );
    void SetServer (Address addr);
    Stack initialiseJavaClass (uint32 level);
    AV_EventHandling *event;
    Unix_FileSystem fileHandling;
}
```

An implementation of PersonalJava (pJava) is discussed. A combination example of the modules of JavaLayer is pJava. It is appreciated that pJava is a Java™ API and Java Application Environment for networked applications running on personal consumer devices. Running pJava on Aperios is targeted for platforms such as set-top boxes which are composed of Aperios real time operating system, download run time environment, Internet-based web browser and home network.

The list of Table VII shows an example of pJava which is created with heap size 2097144, PersonalJava 1.1 compatible, and running an application called "Browser".

TABLE VII

```
pJava = JVM::Creat(2097144, pJaval.1,
    NULL, 0, rfs_FILE);
pJava -> SetServer (43.135.113.83);
pJava-> initializeJVMclass( );
pJava-> executeJavaClass(Browser", "main");
pJava-> executeJavaClass("SmapApplet.Class", "run");
```

The preferred embodiment of the present invention, a computer-implemented method and system for sharing Java classes across multiple Java virtual machines on the same computer system and a method for communication between Java and native applications (or between two or more JVMs), is thus described. While the present invention has been described in particular embodiments, it should be appreciated that the present invention should not be construed as limited by such embodiments, but rather construed according to the below claims.

What is claimed is:

1. In a computer system, a method of sharing Java classes comprising the steps of:
   a) a first Java Virtual Machine (JVM) loading an instantiation of a first Java class into a shared memory pool;
   b) registering a name of said first Java class into a name table that is used for said shared memory pool;
   c) querying said name table on behalf of a second JVM to determine if said first Java class is stored in said shared memory pool, wherein said second JVM is operating on said computer system simultaneously with said first JVM; and
   d) said second JVM accessing and utilizing said instantiation of said first Java class from said shared memory pool in lieu of creating a separate instantiation of said first Java class for its own use.

2. A method as described in claim 1 further comprising the steps of:
   said second JVM loading an instantiation of a second Java class into said shared memory pool;
   registering a name of said second Java class into said name table;
   querying said name table on behalf of a third JVM to determine if said second Java class is stored in said shared memory pool, wherein said third JVM is operating on said computer system simultaneously with said first and said second JVMs; and
   said third JVM accessing and utilizing said instantiation of said second Java class from said shared memory pool in lieu of creating a separate instantiation of said second Java class for its own use.

3. A method as described in claim 1 wherein said step a) comprises the steps of
   a1) accessing a write lock associated with said first Java class;
   a2) granting write access of said first Java class to said first JVM when said write lock associated with said first Java class becomes free; and
   a3) said first JVM writing said instantiation of said first Java class in response to said step a2).

4. A method as described in claim 3 wherein said step a3) comprises the steps of:
   loading said instantiation of said first Java class into blocks of said shared memory space and registering offset and size information regarding said blocks; and
   linking said offset and size information with said name of said first Java class.

5. A method as described in claim 1 wherein said step d) comprises the steps of
   d1) accessing a read lock associated with said first Java class;
   d2) granting access of said first Java class to said second JVM when said read lock associated with said first Java class becomes free; and
   d3) said second JVM accessing said instantiation of said first Java class in response to said step d2).

6. A method as described in claim 1 wherein said first JVM has an associated first Java application and wherein said second JVM has an associated second Java application.

7. A method as described in claim 1 wherein said first Java class is a Java IO class.

8. An embedded computer system having a processor coupled to a bus and a memory device coupled to said bus wherein said memory device contains instructions stored therein that implement a method of sharing Java classes, said method comprising the steps of:
   a) a first Java Virtual Machine (JVM) loading an instantiation of a first Java class into a shared memory pool;
   b) registering a name of said first Java class into a name table that is used for said shared memory pool;
   c) querying said name table on behalf of a second JVM to determine if said first Java class is stored in said shared memory pool, wherein said second JVM is operating on said computer system simultaneously with said first JVM; and
   d) said second JVM accessing and utilizing said instantiation of said first Java class from said shared memory pool in lieu of creating a separate instantiation of said first Java class for its own use.

9. A computer system as described in claim 8 further comprising the steps of:
   said second JVM loading an instantiation of said second Java class into said shared memory pool;
   registering a name of said second Java class into said name table;
   querying said name table on behalf of a third JVM to determine if said second Java class is stored in said shared memory pool, wherein said third JVM is operating on said computer system simultaneously with said first and said second JVMs; and
   said third JVM accessing and utilizing said instantiation of said second Java class from said shared memory pool in lieu of creating a separate instantiation of said second Java class for its own use.

10. A computer system as described in claim 8 wherein said step a) comprises the steps of
    a1) accessing a write lock associated with said first Java class;
    a2) granting write access of said first Java class to said first JVM when said write lock associated with said first Java class becomes free; and
    a3) said first JVM writing said instantiation of said first Java class in response to said step a2).

11. A computer system as described in claim 10 wherein said step a3) comprises the steps of:
    loading said instantiation of said first Java class into blocks of said shared memory space and registering offset and size information regarding said blocks; and linking said offset and size information with said name of said first Java class.

12. A computer system as described in claim 8 wherein said step d) comprises the steps of
   d1) accessing a read lock associated with said first Java class;
   d2) granting access of said first Java class to said second JVM when said read lock associated with said first Java class becomes free; and
   d3) said second JVM accessing said instantiation of said first Java class in response to said step d2).

13. A computer system as described in claim 8 wherein said first JVM has an associated first Java application and wherein said second JVM has an associated second Java application.

14. A computer system as described in claim 8 wherein said first Java class is a Java 10 class.

15. In a computer system, a method of communicating between applications comprising the steps of:
   a) a first Java Virtual Machine (JVM) loading an instantiation of a first Java class into a shared memory pool;
   b) registering a name of said first Java class into a name table that is used for said shared memory pool;
   c) querying said name table on behalf of a second JVM to determine if said first Java class is stored in said shared memory pool, wherein said second JVM is operating on said computer system simultaneously with said first JVM;
   d) said second JVM accessing and utilizing said instantiation of said first Java class from said shared memory pool in lieu of creating a separate instantiation of said first Java class for its own use; and
   e) a first Java application of said first JVM communicating messages to a native application by writing said messages into said shared memory pool and said native application reading said messages from said shared memory pool.

16. A method as described in claim 15 further comprising the step of said native application communicating messages with said first Java application by writing said messages into said shared memory pool and said Java application reading said messages from said shared memory pool.

17. A method as described in claim 15 further comprising the step of said first Java application communicating messages with a second Java application of said second JVM by said first Java application writing said messages into said shared memory pool and said second Java application reading said messages from said shared memory pool.

18. A method as described in claim 15 wherein said step a) comprises the steps of
   a1) accessing a write lock associated with said first Java class;
   a2) granting write access of said first Java class to said first JVM when said write lock associated with said first Java class becomes free; and
   a3) said first JVM writing said instantiation of said first Java class in response to said step a2).

19. A method as described in claim 18 wherein said step a3) comprises the steps of:
   loading said instantiation of said first Java class into blocks of said shared memory space and registering offset and size information regarding said blocks; and
   linking said offset and size information with said name of said first Java class.

20. A method as described in claim 15 wherein said step d) comprises the steps of
   d1) accessing a read lock associated with said first Java class;
   d2) granting access of said first Java class to said second JVM when said read lock associated with said first Java class becomes free; and
   d3) said second JVM accessing said instantiation of said first Java class in response to said step d2).

* * * * *